United States Patent

Ruhlmann et al.

[11] Patent Number: 5,964,900
[45] Date of Patent: Oct. 12, 1999

[54] PROCESS FOR DYEING OR PRINTING CELLULOSIC FIBRE MATERIALS AND NOVEL REACTIVE DYES

[75] Inventors: Edmond Ruhlmann, Saint-Louis, France; Athanassios Tzikas, Pratteln, Switzerland; Herbert Klier, Efringen-Kirchen, Germany

[73] Assignee: Ciba Specialty Chemicals Corporation, Tarrytown, N.Y.

[21] Appl. No.: 09/100,002

[22] Filed: Jun. 17, 1998

[51] Int. Cl.[6] .................................................. C09B 62/00
[52] U.S. Cl. ........................... 8/549; 8/918; 8/921; 8/543
[58] Field of Search ................................. 8/549, 918, 921, 8/543, 546

[56] References Cited

U.S. PATENT DOCUMENTS 5,093,484  3/1992  Herd ........................................ 534/642

FOREIGN PATENT DOCUMENTS 47-14348  4/1972  Japan .

OTHER PUBLICATIONS

Derwent Abstract 29139T–AEF, Apr. 4, 1972, Takuo Ikeda et al.

Chemical Abstract Registry No. 185307–50–0, No date given.

Primary Examiner—Mark Kopec
Assistant Examiner—Brian P. Mruk
Attorney, Agent, or Firm—Kevin T. Mansfield

[57] ABSTRACT

A process for dyeing or printing cellulosic fiber materials, which comprises using at least one reactive dye of formula

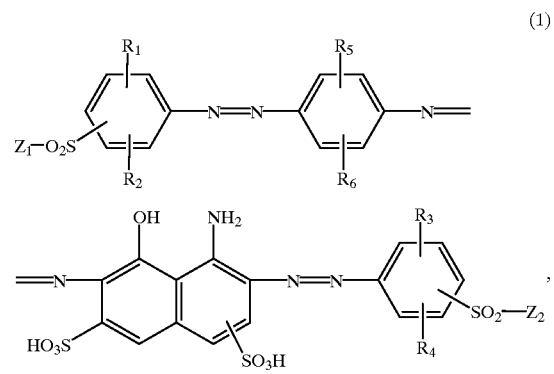

(1)

wherein
  $R_1$, $R_2$, $R_3$ and $R_4$ are each independently of one another hydrogen, halogen, sulfo, $C_1$–$C_4$alkyl or $C_1$–$C_4$alkoxy,
  $R_5$ and $R_6$ are each independently of the other hydrogen, halogen, $C_1$–$C_4$alkyl, $C_2$–$C_4$alkanoylamino, ureido, or $C_1$–$C_4$alkoxy which is unsubstituted or substituted in the alkyl moiety by hydroxyl, sulfato or $C_1$–$C_4$alkoxy,
  $Z_1$ and $Z_2$ are each independently of the other vinyl or the radical —$CH_2$—$CH_2$—U, and
  U is a leaving group.

6 Claims, No Drawings

PROCESS FOR DYEING OR PRINTING CELLULOSIC FIBRE MATERIALS AND NOVEL REACTIVE DYES

The present invention relates to a process for dyeing or printing cellulosic fibre materials with reactive dyes as well as to novel reactive dyes.

The practice of dyeing and printing with reactive dyes has given rise in recent times to more stringent demands being made on the quality of the dyeings and prints and on the economy of the dyeing and printing process. For this reason, there is still a need for novel processes which have improved properties regarding the application as well as the dyeings and prints obtained.

Dyeing and printing today calls for processes in which the reactive dyes have sufficient substantivity and at the same time good washing off properties with respect to unfixed dye. In addition, the dyeings and prints shall have a good tinctorial yield and high degrees of fixation. The known processes do not meet these requirements in all respects.

The present invention therefore has for its object to provide novel improved processes for dyeing and printing fibre materials, which processes have the above specified qualities to a high degree. The novel processes shall be distinguished in particular by excellent fixation yields and superior fibre-dye bond stability of the reactive dyes, and unfixed dye shall also be readily washed off. They shall also produce dyeings and prints with good allround fastness properties, for example lightfastness and wetfastness.

It has been found that this object is substantially achieved with the process defined in more detail below.

This invention relates to a process for dyeing or printing cellulosic fibre materials, which comprises using at least one reactive dye of formula

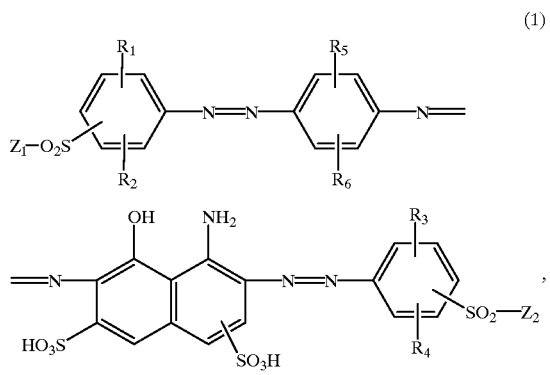

(1)

wherein $R_1$, $R_2$, $R_3$ and $R_4$ are each independently of one another hydrogen, halogen, sulfo, $C_1$–$C_4$alkyl or $C_1$–$C_4$alkoxy, $R_5$ and $R_6$ are each independently of the other hydrogen, halogen, $C_1$–$C_4$alkyl, $C_2$–$C_4$alkanoylamino, ureido, or $C_1$–$C_4$alkoxy which is unsubstituted or substituted in the alkyl moiety by hydroxyl, sulfato or $C_1$–$C_4$alkoxy, $Z_1$ and $Z_2$ are each independently of the other vinyl or the radical —$CH_2$—$CH_2$—U, and U is a leaving group.

Sulfo groups in the reactive dyes of formula (1) may generally be present in the form of the free acid (—$SO_3H$) as well as in any salt form, for example as the alkali metal, alkaline earth metal or ammonium salts or as the salt of an organic amine, such as the sodium, potassium, lithium or ammonium salt, the salt of triethanolamine or as the mixed salt of two or more different cations, e.g. the Na/Li, Na/$NH_4$ or Na/Li/$NH_4$ mixed salt.

$R_1$, $R_2$, $R_3$, $R_4$, $R_5$ and $R_6$ defined as $C_1$–$C_4$alkyl may be, for example, methyl, ethyl, propyl, isopropyl, butyl, sec-butyl, tert-butyl or isobutyl, preferably methyl.

$R_1$, $R_2$, $R_3$, $R_4$, $R_5$ and $R_6$ defined as $C_1$–$C_4$alkoxy may be, for example, methoxy, ethoxy, propoxy, isopropoxy, butoxy or isobutoxy, preferably methoxy. $R_5$ and $R_6$ defined as $C_1$–$C_4$alkoxy may be unsubstituted or substituted by $C_1$–$C_4$alkoxy, for example methoxy or ethoxy, hydroxy or, preferably, sulfato. Typical examples of such radicals to be mentioned are —O—$CH_2CH_2$—OH and —O—$CH_2CH_2$—$OSO_3H$.

$C_2$–$C_4$Alkanoylamino $R_5$ and $R_6$ is preferably acetylamino or propionylamino, more preferably acetylamino.

$R_1$, $R_2$, $R_3$, $R_4$, $R_5$ and $R_6$ defined as halogen is suitably fluoro, chloro or bromo. Chloro is preferred.

$Z_1$ and $Z_2$ defined as a radical —$CH_2$—$CH_2$—U may be a leaving group U, for example —Cl, —Br, —F, —$OSO_3H$, —$SSO_3H$, —OCO—$CH_3$, —$OPO_3H_2$, —OCO—$C_6H_5$, —$OSO_2$—$C_1$–$C_4$alkyl or —$OSO_2$—N($C_1$–$C_4$alkyl)$_2$. U is preferably a group of formula —Cl, —$OSO_3H$, —$SSO_3H$, —OCO—$CH_3$, —OCO—$C_6H_5$ or —$OPO_3H_2$, more preferably —Cl, —$OSO_3H$ or —OCO—$CH_3$ and, particularly preferably, —Cl or —$OSO_3H$. U is very particularly preferably a group of formula —$OSO_3H$.

$Z_1$ and $Z_2$ are each independently of the other preferably vinyl, β-chloroethyl, β-sulfatoethyl, β-thiosulfatoethyl, β-acetoxyethyl or β-phosphatoethyl and, particularly preferably, vinyl or especially β-sulfatoethyl. $Z_1$ and $Z_2$ may be different or identical and are preferably identical.

The radicals of formulae —$SO_2$—$Z_1$ and —$SO_2$—$Z_2$ in the reactive dyes of the above formula (1) are preferably bound in para-position relative to the azo bridge.

$R_1$, $R_2$, $R_3$ and $R_4$ are preferably each independently of one another hydrogen, sulfo or $C_1$–$C_4$alkoxy, more preferably hydrogen or sulfo. A particularly important meaning for $R_1$ is sulfo.

Particularly preferably, $R_1$ is hydrogen or sulfo and $R_2$, $R_3$ and $R_4$ are hydrogen. Very particularly preferably, $R_1$ is sulfo and $R_2$, $R_3$ and $R_4$ are hydrogen.

$R_5$ and $R_6$ are preferably each independently of the other halogen, $C_1$–$C_4$alkyl, $C_2$–$C_4$alkanoylamino, ureido, or $C_1$–$C_4$alkoxy which is unsubstituted or substituted in the alkyl moiety by hydroxyl, sulfato or $C_1$–$C_4$alkoxy, more preferably $C_1$–$C_4$alkyl, or $C_1$–$C_4$alkoxy which is unsubstituted or substituted in the alkyl moiety by hydroxyl, sulfato or $C_1$–$C_4$alkoxy.

$R_5$ and $R_6$ are particularly preferably each independently of the other $C_1$–$C_4$alkyl, or $C_1$–$C_4$alkoxy which is unsubstituted or sulfato-substituted in the alkyl moiety.

$R_5$ is preferably $C_1$–$C_4$alkoxy which is unsubstituted or sulfato-substituted in the alkyl moiety, more preferably methoxy or a radical of formula —O—$CH_2CH_2$—$OSO_3H$.

$R_6$ is preferably $C_1$–$C_4$alkyl, in particular methyl.

Preferred reactive dyes of formula (1) are those, wherein $R_1$ is hydrogen or sulfo, $R_2$, $R_3$ and $R_4$ are hydrogen, $R_5$ is $C_1$–$C_4$alkoxy which is unsubstituted or sulfato-substituted in the alkyl moiety, $R_6$ is $C_1$–$C_4$alkyl, $Z_1$ and $Z_2$ are each independently of the other vinyl or, preferably, the radical —$CH_2$—$CH_2$—U, and U is a radical of formula —$OSO_3H$.

Particularly preferred reactive dyes of formula (1) are those of formula

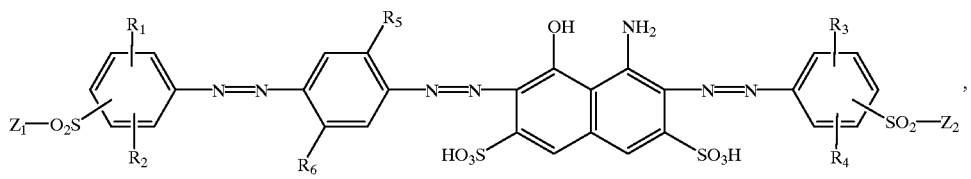

(2)

wherein $R_1$, $R_2$, $R_3$, $R_4$, $R_5$, $R_6$, $Z_1$ and $Z_2$ have the meanings and preferred meanings given above.

Very particularly preferred reactive dyes of formula (1) are those of formula

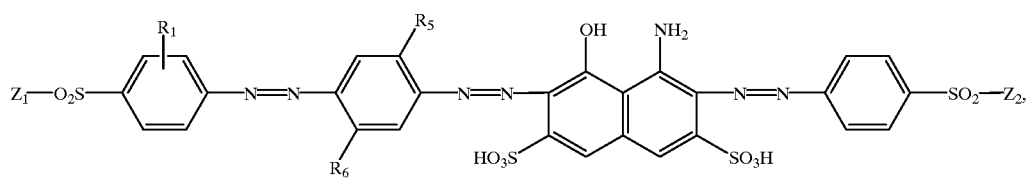

(3)

wherein $R_1$, $R_5$, $R_6$, $Z_1$ and $Z_2$ have the meanings and preferred meanings given above. In this connection, $R_1$ is preferably hydrogen or sulfo, $R_5$ is $C_1$–$C_4$alkoxy which is unsubstituted or sulfato-substituted in the alkyl moiety, $R_6$ is $C_1$–$C_4$alkyl, $Z_1$ and $Z_2$ are each independently of the other vinyl or, preferably, the radical —$CH_2$—$CH_2$—U, and U is the group of formula —$OSO_3H$. $R_5$ is preferably methoxy or the radical —O—$CH_2CH_2$—$OSO_3H$, and $R_6$ is methyl.

The process of this invention is suitable for dyeing and printing cellulosic fibre materials of all kinds. Examples of such cellulosic fibre materials are the natural cellulose fibres, such as cotton, linen and hemp, as well as cellulose and regenerated cellulose. The novel process is also suitable for dyeing or printing cellulosic fibres which are present in blends, for example in blends of cotton and polyester fibres or cotton and polyamide fibres. The novel process is particularly suitable for dyeing or printing cotton.

The conventional dyeing or printing processes may be employed for the novel process. In addition to containing water and the dyes, the dye liquors or printing pastes may contain further auxiliaries, for example wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

In the novel process, the amounts of reactive dyes in the dye liquors can vary depending on the desired tinctorial strength. Amounts of 0.01 to 10% by weight, preferably of 0.01 to 6% by weight, based on the goods to be dyed, have usually been found to be advantageous.

Dyeing is preferred for the novel process, in particular dyeing by the exhaust process or, preferably, by the pad-dyeing process.

Dyeing by the exhaust process is usually carried out in aqueous medium, at a liquor ratio of typically 1:2 to 1:60, preferably at a liquor ratio of 1:5 to 1:20, and at a temperature in the range from 20 to 105° C., in particular from 40 to 90° C. and, preferably, from 40 to 80° C.

Dyeing by the pad-dyeing process is usually carried out by impregnating the goods with aqueous and, where required, saline, dye solutions. The pick-up here is e.g. from 20 to 150%, in particular from 40 to 120% and, preferably, from 50 to 100%, based on the weight of the fibre material to be dyed. Where appropriate, the liquor already contains fixing alkali, or the fibre material is treated with fixing alkali after impregnation. Suitable alkali metals are, for example, sodium carbonate, sodium bicarbonate, sodium hydroxide, disodium phosphate, trisodium phosphate, borax, aqueous ammonia, sodium trichloroacetate, sodium formiate or a mixture of sodium silicate and an aqueous sodium carbonate solution. Preference is given to alkali hydroxide and/or alkali carbonate, in particular to sodium hydroxide and/or sodium carbonate.

Fixation can be carried out, for example, by the action of heat, such as by steaming the impregnated fibre material at a temperature of e.g. 100 to 120° C., preferably in saturated steam. In accordance with the so-called cold pad-batch method, the dye is applied together with the alkali to the padder and is then fixed by storing for several hours, for example for 3 to 40 hours, at room temperature. After fixation, the dyeings or prints are thoroughly rinsed, if requried with addition of a dispersant.

The dyeings and prints obtained by the novel process are distinguished by good build-up and good levelness. The degree of fixation is high and unfixed dye can be readily washed off, the difference between degree of exhaustion and degree of fixation being small, i.e. soap loss being small. The dyeings and prints obtained by this process have excellent tinctorial strength and a high fibre-dye bond stability, good fastness to light as well as excellent wetfastness properties, such as fastness to washing, water, sea-water, cross-dyeing and perspiration, as well as good fastness to pleating, ironing and rubbing.

In another of its apsects, this invention relates to concentrated aqueous formulations which comprise 5 to 50% by weight of at least one reactive dye of the above formula (1). The meanings and preferred meanings indicated above apply to the reactive dyes of formula (1).

The novel aqueous formulations preferably comprise 5 to 40% by weight, more preferably 10 to 40% by weight and, most preferably, 10 to 30% by weight, of at least one reactive dye of formula (1).

The formulations are preferably adjusted to a pH from 3 to 8, more preferably from 3 to 7 and, most preferably, from 4 to 7. The pH is adjusted with a buffer, for example by addition of a polyphosphate or a hydrogen/dihydrogenphosphate buffer. Other buffers to be mentioned are sodium acetate or potassium acetate, sodium oxalate or potassium oxalate, and sodium borate as well as the mixtures thereof.

In addition, the formulations can comprise a component improving the water-solubility of the dye, for example ε-caprolactam or N-methylpyrrolidone. These components are normally used in an amount of 0.1 to 30% by weight, based on the total weight of the formulation. The formulations can also comprise auxiliaries improving their properties, for example surfactants, foam suppressants, anti-freezing agents or fungistatic and/or bacteriostatic agents. These auxiliaries are usually present in small amounts, such as from about 1 to 10 g/l.

The formulations of this invention are storage-stable over a prolonged period of time and are low-viscous and can be used, in particular, in the processes cited above for dyeing.

This invention also relates to reactive dyes of formula

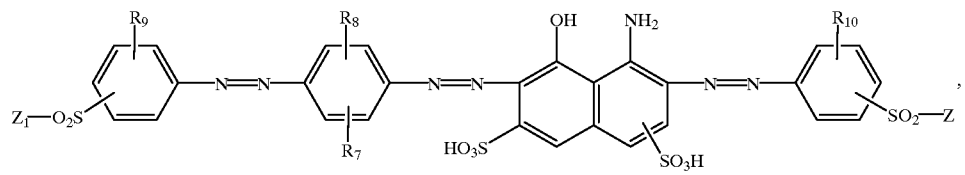

(4)

wherein $R_7$, $R_9$ and $R_{10}$ are each independently of one another hydrogen, $C_1$–$C_4$alkyl, $C_1$–$C_4$alkoxy or halogen, $R_8$ is hydroxy- or sulfato-substituted $C_1$–$C_4$alkoxy, and Z is vinyl, β-sulfatoethyl, β-chloroethyl or β-acetoxyethyl.

$R_7$, $R_9$ and $R_{10}$ are each independently of one another hydrogen, $C_1$–$C_4$alkyl, such as methyl, ethyl, n-propyl, isopropyl, $C_1$–$C_4$alkoxy, such as methoxy, ethoxy, isopropoxy, or halogen, such as fluoro, bromo or, preferably, chloro. $R_7$ is preferably $C_1$–$C_4$alkyl, in particular methyl. $R_9$ and $R_{10}$ are preferably each hydrogen.

Preferred dyes of this invention are also those of of formula

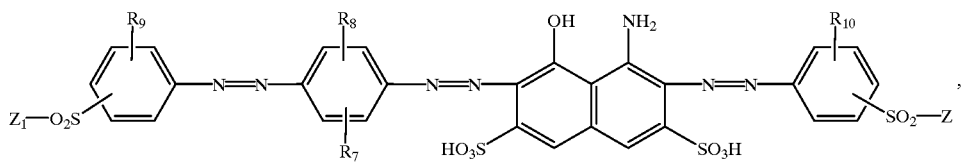

(5)

wherein $R_7$, $R_8$, $R_9$, $R_{10}$ and Z have the meanings and preferred meanings given for formula (4).

Particularly preferred dyes of this invention are those of formula

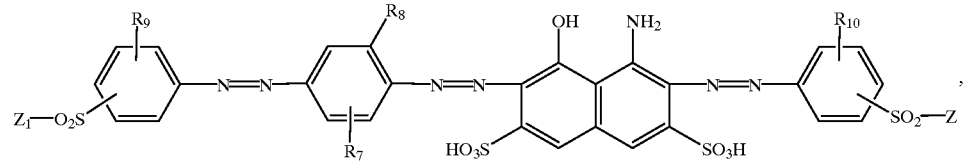

(6)

wherein $R_7$, $R_8$, $R_9$, $R_{10}$ and Z have the meanings and preferred meanings given for formula (4).

Very particularly preferred dyes are those of formula (4), (5) and (6), wherein $R_9$ and $R_{10}$ are hydrogen.

Important dyes are those of formula

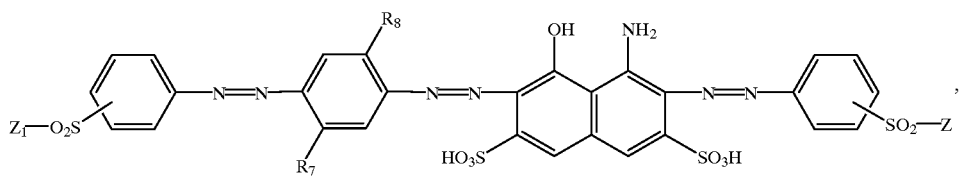
(7)

wherein $R_7$ is $C_1$–$C_4$alkyl, in particular methyl, $R_8$ is hydroxy- or sulfato-substituted $C_1$–$C_4$alkoxy, in particular β-sulfatoethoxy, and Z is vinyl, β-chloroethyl or β-sulfatoethyl.

Particularly important dyes are those of formula

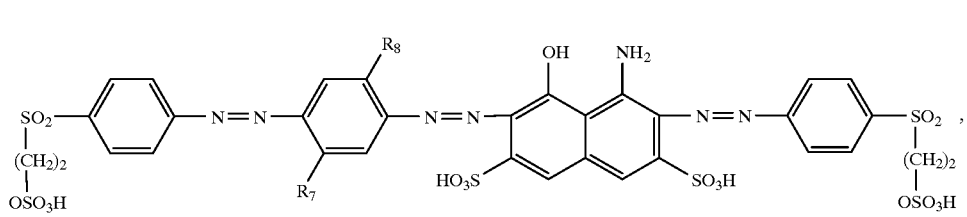
(8)

wherein $R_7$ is $C_1$–$C_4$alkyl, in particular methyl, and $R_8$ is a sulfato-substituted $C_1$–$C_4$alkoxy radical, preferably β-sulfatoethoxy.

A very particularly important dye is that of formula (8), wherein $R_7$ is methyl and $R_8$ is β-sulfatoethoxy.

This invention also relates to a process for the preparation of the dyes of formula (4), which comprises diazotising first a compound of formula

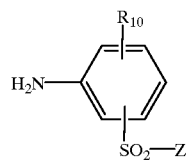
(9)

and acid coupling it to a compound of formula

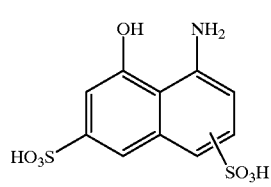
(10)

and then diazotising a compound of formula

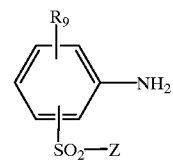
(11)

and coupling the diazonium compound so obtained in alkaline medium to the monoazo compound produced earlier, $R_7$, $R_8$, $R_9$, $R_{10}$ and Z having the meanings given for formula (4).

The compounds of formulae (9), (10) and (11) are known per se or can be prepared in general analogy to known compounds.

The compound of formula (11) is obtained by diazotising a compound of formula (12)

and coupling the diazonium compound so obtained to a compound of formula

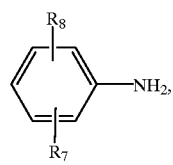

(13)

$R_7$, $R_8$, $R_9$ and Z in formulae (12) and (13) having the meanings given for formula (4).

A typical example of compounds of formulae (9) and (12) is 4-(β-sulfatoethylsulfonyl)aniline. Typical examples of compounds of formula (10) are H-acid and K-acid.

Illustrative examples of compounds of formula (13) are 2-(β-hydroxyethoxy)-5-methylaniline and 2-(β-sulfatoethoxy)-5-methylaniline.

The diazotisation of the diazo components or of the intermediates containing a diazotisable amino group is usually carried out by the action of nitric acid in an aqueous solution of mineral acid at low temperature. Coupling to the coupling component is carried out at strongly acid, neutral to weakly alkaline pH values.

The above reactive dyes of formula (1) can be obtained in general analogy to the process for the preparation of the reactive dyes of formula (4).

The reactive dyes of formula (4) can also be used in mixtures with each other or in mixtures with other reactive dyes or nonreactive dyes, e.g. acid dyes or disperse dyes, for dyeing or printing the cited fibre materials.

In another of its aspects, this invention relates to the intermediates of formula (13), wherein $R_8$ is sulfatoalkoxy, in particular β-sulfatoethoxy. Preferred intermediates are those of formula

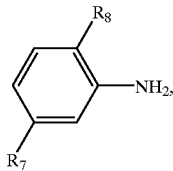

(14)

wherein $R_7$ is $C_1$–$C_4$alkyl, in particular methyl, and $R_8$ is sulfatoalkoxy, in particular β-sulfatoethoxy.

This invention also relates to the intermediates of formula (11), wherein $R_7$, $R_8$, $R_9$ and Z have the meanings and preferred meanings given for formula (4).

Preferred intermediates are those of formula

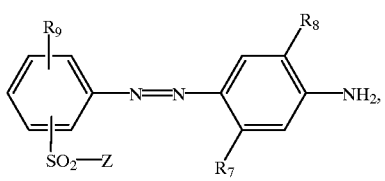

(15)

wherein $R_7$, $R_8$, $R_9$ and Z have the given meanings and preferred meanings. $R_9$ in formula (15) is preferably hydrogen. The radical —$SO_2$—Z is preferably bound in para-position to the azo group.

Sulfo groups in the novel reactive dyes of formula (4) may generally be present in the form of the free acid (—$SO_3H$) as well as in any salt form, e.g. as the alkali metal, alkaline earth metal or ammonium salts or as the salt of an organic amine, such as the sodium, potassium, lithium or ammonium salt, the salt of triethanolamine or as the mixed salt of two or more different cations, e.g. the Na/Li, Na/$NH_4$ or Na/Li/$NH_4$ mixed salt.

The reactive dyes of formula (4) are suitable for dyeing and printing a very wide range of materials, such as silk, leather, wool, polyamide fibres and polyurethanes and, in particular, cellulosic fibre materials of all kinds. Such fibre materials include, for example, the natural cellulose fibres, such as cotton, linen and hemp, as well as cellulose and regenerated cellulose, e.g. viscose and also modal fibres and their blends with cotton. The reactive dyes of formula (4) are also suitable for dyeing or printing hydroxyl group-containing fibres which are present in blends, for example in blends of cotton with polyamide fibres or, in particular, with polyester fibres.

The novel reactive dyes may be applied to and fixed on the fibre material in different manner, preferably in the form of aqueous dye solutions and printing pastes. The novel reactive dyes are suitable for the exhaust process as well as for dyeing by the pad-dyeing process. The reactive dyes of formula (4) are particularly suitable for the novel dyeing or printing process described above as well as for the novel concentrated aqueous formulations.

The reactive dyes of formula (4) are distinguished by high reactivity, good fixation and excellent build-up. They can therefore be applied by the exhaust process at low dyeing temperatures and require only short steaming times when used in the pad-steam process. The degree of fixation is high and unfixed dye can be readily washed off. The difference between degree of exhaustion and degree of fixation is remarkably small, i.e. the soap loss is very small. The reactive dyes of formula (4) are also particularly suitable for printing, especially on cotton, and also for printing nitrogen-containing fibres, e.g. wool, silk, or blends containing wool or silk.

The dyeings and prints obtained with the novel reactive dyes of formula (4) have excellent tinctorial strength and excellent dye-fibre bond stability both in the acid and in the alkaline range, and they also have good lightfastness and excellent wetfastness properties such as fastness to washing, water, sea-water, cross-dyeing and perspiration, as well as good fastness to pleating, ironing and rubbing.

The invention is illustrated by the following Examples, in which temperatures are given in degrees Celsius and parts and percentages are by weight, unless otherwise stated. The ratio of parts by weight to parts by volume is the same as that of the kilogramme to the liter.

EXAMPLE 1

Preparation of the $1^{st}$ chromophore constituent: 588.5 parts of sulfuric acid (100%) are placed in a vessel and 167.2 parts of 2-(β-hydroxyethoxy)-5-methylaniline are added such that the temperature does not rise above 30° C. This mixture is stirred at 30° C. for 4 hours and is then slowly added to an ice/water mixture, resulting in a compound which, in the form of the free acid, corresponds to formula (100)

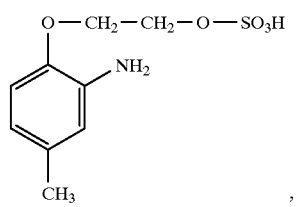
(100)

120 parts of 4-(β-sulfatoethylsulfonyl)aniline are made into a slurry in 225 parts of water and are then dissolved with 52.5 parts of a 30% NaOH solution. This solution is added to 450 parts of ice and charged with 103 parts of 32% hydrochloric acid. Subsequently, 104 parts of a sodium nitrite solution (4N) are added dropwise over 30 minutes at 0 to 5° C. and the mixture is stirred for 15 minutes. The diazo suspension so obtained is coupled as follows to the compound of formula (100):

99.0 parts of the compound of formula (100) are made into a slurry with 500 parts of water, the pH of which is adjusted to 5 with a 30% NaOH solution, the temperature being kept at 0 to 5° C. The diazo suspension is added and the pH is adjusted to 5 with NaOH (2N), giving a good yield of the dye which, in the form of the free acid, corresponds to formula

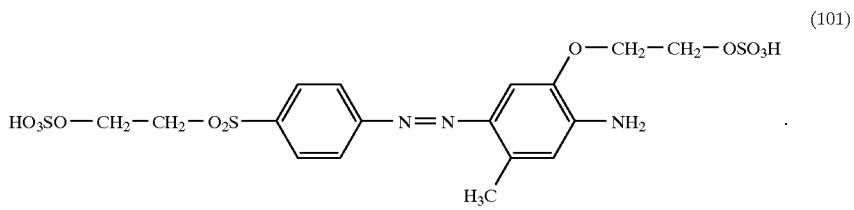
(101)

The dye of formula (101) can be isolated as potassium salt.

Preparation of the 2$^{nd}$ chromophore constituent: 15 parts of 4-(β-sulfatoethylsulfonyl)aniline are made into a slurry in 75 parts of water and are then dissolved with 6.7 parts of a 30% NaOH solution. This solution is added to 30 parts of ice and charged with 14 parts of 32% hydrochloric acid. Subsequently, 13.2 parts of a sodium nitrite solution (4N) are added dropwise over 45 minutes at 10° C. and stirred for 15 minutes. The diazo suspension so obtained is coupled as follows to H-acid:

16.0 parts of H-acid are made into a slurry in 55 parts of water and are run into the diazo suspension over 10 minutes. The mixture is stirred for 3 hours at 10 to 15° C., giving the monoazo suspension of the dye which, in the form of the free acid, corresponds to formula (102)

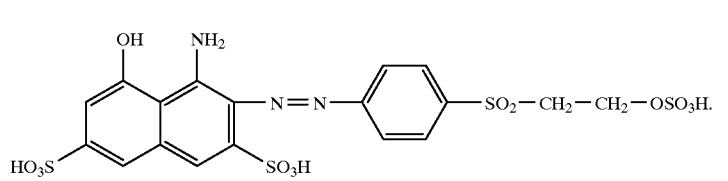
(102)

Preparation of the dye of formula

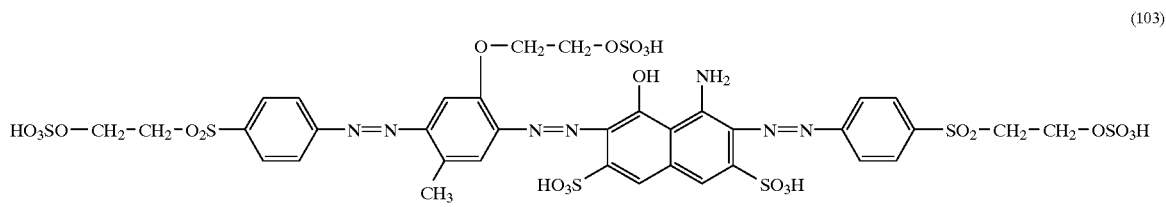
(103)

from the two chromophore constituents (101) and (102):

28.3 parts of the compound of formula (101) are made into a slurry in 200 parts of water and are charged with 11 parts of 32% hydrochloric acid and heated to 30° C. Subsequently, 13.2 parts of a sodium-nitrite solution (4N) are added over 45 minutes at 30° C. The monoazo suspension of the dye of formula (102) is run into this diazo suspension, the pH being adjusted to 7.5 with NaOH (2N). The mixture is stirred for several hours and the product is then desalted by reverse osmosis and lyophilised, giving the dye which, in the form of the free acid, corresponds to formula (103) and which dyes cotton in an olive green shade.

EXAMPLE 2

Preparation of the $1^{st}$ chromophore constituent: 41 parts of 2-sulfo-4-(β-sulfatoethylsulfonyl)-aniline are made into a slurry in 80 parts of water and 50 parts of ice, and 25 parts of 32% hydrochloric acid are then run into this slurry at about 15° C. Subsequently, 29 parts of a 28% sodium nitrite solution are added dropwise over 40 minutes at about 25° C. and the reaction mixture is stirred.

The diazo suspension so obtained is coupled as follows to 3-amino-4-methoxytoluene: 15 parts of 3-amino-4-methoxytoluene are made into a slurry in 100 parts of water and this mixture is adjusted to pH 4.

The diazo suspension obtainable as indicated above is added and the pH is adjusted to 4 with NaOH (2N), giving the dye which, in the form of the free acid, corresponds to formula

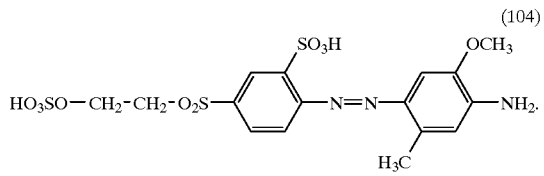

(104)

The dye of formula (104) can be isolated as potassium salt.

Preparation of the $2^{nd}$ chromophore constituent: The preparation of the dye of formula (102) can be carried out as indicated in Example 1.

Preparation of the dye of formula

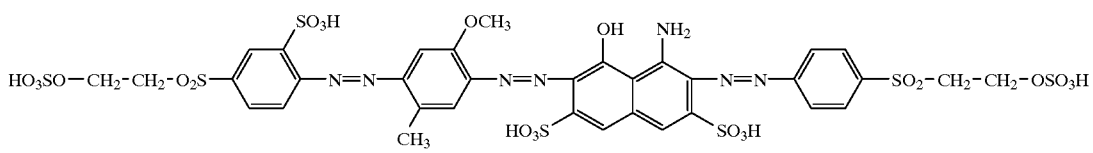

(105)

26 parts of the compound of formula (104) are made into a slurry in 300 parts of water and 13 parts of a 28% sodium nitrite solution are added at 20° C. and then 10 parts of 32% hydrochloric acid are run into this mixture over 1 hour and stirred.

The temperature of the monoazo suspension of the dye of formula (102) is adjusted to 0° C. by addition of ice and the pH is adjusted to 7.5 by addition of a solution of disodium hydrogenphosphate and NaOH (30%). The diazo suspension obtained as indicated above is run into this mixture over 1 hour while keeping the above pH constant, and stirring is continued for several hours at pH 7.5. The product is then desalted by reverse osmosis and lyophilised, giving the dye which, in the form of the free acid, corresponds to formula (105) and which dyes cotton in an olive green shade.

Dyeing Instruction I 2 parts of the reactive dye obtained in Example 1 are dissolved in 400 parts of water. To this solution are added 1500 parts of a solution which contains 53 g/l of sodium chloride. 100 parts of cotton fabric are put into this dye bath at 40° C. and, after 45 minutes, 100 parts of a solution containing 16 g/l of sodium hydroxide and of 20 g calcined sodium carbonate are added. The dyed goods are then rinsed, soaped at the boil for a quarter of an hour with a nonionic detergent, rinsed again and dried.

Dyeing Instructions II 1 part of the reactive dye obtained in Example 2 is dissolved in 400 parts of water. To this solution are added 600 parts of a solution which contains 30 g/l of sodium chloride. 100 parts of cotton fabric are put into this dye bath at 60° C. and, after 45 minutes, 10 g/l of calcined sodium carbonate are added. Dyeing is continued for another 45 minutes at 60° C. and the dyed goods are then rinsed, soaped at the boil for a quarter of an hour with a nonionic detergent, rinsed again and dried.

Dyeing Instructions III 5 parts of the reactive dye obtained in Example 2 are dissolved in 50 parts of water. To this solution are added 50 parts of a solution which contains 15 ml/l of sodium hydroxide (36° bé) and 70 ml/l of sodium silicate (38° bé). A cotton fabric is pad-dyed with the solution so obtained such that it increases by 70% of its weight, and is then rolled up on a roll. The cotton fabric is stored thus for 10 hours at room temperature. The dyed fabric is then rinsed, soaped at the boil for a quarter of an hour with a nonionic detergent, rinsed again and dried.

Dyeing Instructions IV 5 parts of the reactive dye obtained in Example 2 are dissolved in 100 parts of water with addition of 0.1 part of sodium m-nitrobenzenesulfonate, 6 parts of sodium chloride and 1 part of sodium carbonate. A cotton fabric is impregnated with the solution so obtained such that it increases by 75% of its weight. The dyeing is then steamed for 90 seconds at 100 to 102° C. and the dyed fabric is then rinsed, soaped for a quarter of an hour with a 0.3% boiling solution of a nonionic detergent, rinsed again and dried.

Dyeing Instructions V 5 parts of the reactive dye obtained in Example 2 are dissolved in 100 parts of water with addition of 0.5 part of sodium m-nitrobenzenesulfonate. A cotton fabric is impregnated with the solution so obtained such that it increases by 75% of its weight, and is then dried. The fabric is impregnated with a 25° C. solution which contains 15 ml/l of sodium hydroxide (36° bé) and 250 g/l of sodium chloride, and the fabric is then pinched off to a 75% increase in weight. The dyeing is then steamed for 60 seconds at 100 to 102° C., rinsed, soaped for a quarter of an hour with a 0.3% boiling solution of a nonionic detergent, rinsed again and dried.

Printing Instruction 3 parts of the reactive dye obtained in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzenesulfonate and 1.2 parts of sodium hydrogencarbonate. A cotton fabric is printed with the printing paste so obtained. After drying the printed fabric so obtained, it is steamed for 2 minutes at 102° C. in saturated steam. The printed fabric is then rinsed, if necessary soaped at the boil, then rinsed once more and subsequently dried.

What is claimed is:

1. A process for dyeing or printing cellulosic fibre materials, which comprises dyeing with at least one reactive dye of the formula

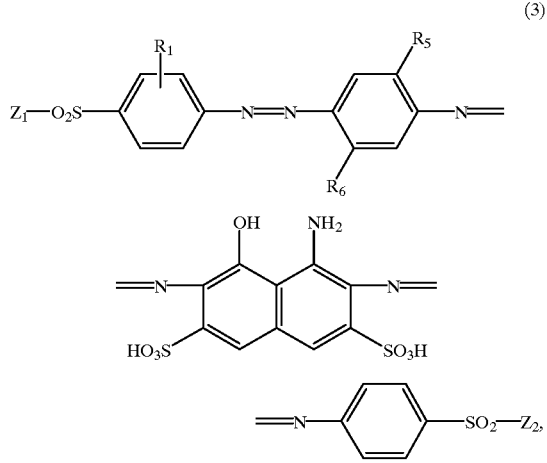

(3)

wherein $R_1$ is hydrogen or sulfo, $R_5$ is —O—$CH_2CH_2$—OH or —O—$CH_2CH_2$—$OSO_3H$, $R_6$ is $C_1$–$C_4$alkyl, $Z_1$ and $Z_2$ are each independently of the other vinyl or the radical —$CH_2$—$CH_2$—U, and U is a radical —$OSO_3H$.

2. A process according to claim 1, wherein $R_1$ is sulfo.

3. A process according to claim 1, which comprises dyeing the cellulosic fibre material by the exhaust process or by the pad-dyeing process.

4. A process according to claim 1, which comprises dyeing the cellulosic fibre material by the pad-dyeing process.

5. A process according to claim 1, which comprises dyeing the cellulosic fibre material by the exhaust process at a temperature in the range from 20 to 105° C. and at a liquor ratio of 1:2 to 1:60.

6. A process according to claim 1, wherein the cellulosic fibre material is cotton.

* * * * *

UNITED STATES PATENT AND TRADEMARK OFFICE
CERTIFICATE OF CORRECTION

PATENT NO. : 5,964,900
DATED : OCTOBER 12, 1999
INVENTOR(S) : EDMOND RUHLMANN ET AL.

It is certified that error appears in the above-identified patent and that said Letters Patent is hereby corrected as shown below:

on the title page, item [30] should read:

-- [30]  Foreign Application Priority Data

June 24, 1997  [CH]  Switzerland  1529/97

Oct. 27, 1997  [CH]  Switzerland  2486/97 --.

Signed and Sealed this

Twenty-eighth Day of March, 2000

Attest:

Q. TODD DICKINSON

*Attesting Officer*      *Commissioner of Patents and Trademarks*